United States Patent [19]

Dufour et al.

[11] 4,439,571

[45] Mar. 27, 1984

[54] THERMALLY STABILIZED POLYMERS

[75] Inventors: Daniel L. Dufour, Longmeadow; Alva F. Harris, Wilbraham; John B. Ott, Greenfield, all of Mass.

[73] Assignee: Monsanto Company, St. Louis, Mo.

[21] Appl. No.: 305,016

[22] Filed: Sep. 24, 1981

[51] Int. Cl.$^3$ .......................... C08K 5/15; C08K 5/04; C08K 3/38
[52] U.S. Cl. .................................... 524/183; 524/405
[58] Field of Search ............... 524/183, 405; 526/272; 525/74, 207, 337, 329

[56] References Cited

U.S. PATENT DOCUMENTS

| | | | |
|---|---|---|---|
| 2,439,227 | 4/1948 | Seymour et al. | 525/285 |
| 2,617,783 | 11/1952 | Slocombe | 260/45.7 |
| 2,630,416 | 3/1953 | La Piana | 525/337 |
| 2,894,020 | 7/1959 | McManimie | 524/183 |
| 2,914,505 | 11/1959 | Roper et al. | 526/272 |
| 3,015,653 | 1/1962 | Richards et al. | 525/329 |
| 3,177,267 | 4/1965 | Luvisi | 524/183 |
| 3,600,351 | 8/1971 | Hunt et al. | 524/183 |
| 3,642,949 | 2/1972 | Stafford et al. | 260/876 R |
| 3,671,478 | 6/1972 | Doyle et al. | 525/337 |
| 3,794,616 | 12/1974 | Dennis et al. | 260/45.7 P |
| 4,141,934 | 2/1979 | Wingler et al. | 525/53 |
| 4,197,263 | 4/1980 | Li et al. | 525/207 |
| 4,197,376 | 4/1980 | Lee | 525/70 |
| 4,205,160 | 3/1980 | Gloth et al. | 526/336 |
| 4,223,096 | 9/1980 | Lee | 525/74 |
| 4,262,096 | 4/1981 | Lee et al. | 525/285 |
| 4,298,716 | 11/1981 | Dufour | 526/272 |
| 4,329,272 | 5/1982 | Dufour | 525/207 |

FOREIGN PATENT DOCUMENTS 55-161836  12/1980  Japan .

OTHER PUBLICATIONS

N. Grassie and J. N. Hay: "Thermal Discoloration of Nitrile Polymers," *Thermal Degradation of Polymers*-SCT Monograph No. 13, Society of Chemical Industry, London (1961) pp. 184–199.

*Primary Examiner*—Veronica P. Hoke
*Attorney, Agent, or Firm*—W. J. Farrington; P. D. Matukaitis; A. H. Cole

[57] ABSTRACT

The tendency to crosslink of polymer compositions comprising polymer units derived from acrylonitrile and maleic anhydride is controlled by the use of boron compounds selected from boron oxide, boron acids and esters of boron acids.

8 Claims, No Drawings

THERMALLY STABILIZED POLYMERS

BACKGROUND OF THE INVENTION

This invention relates to polymers and polyblends, comprising, as polymerized components, an unsaturated dicarboxylic acid anhydride and an unsaturated nitrile. More specifically, it relates to such polymers and polyblends that have been stabilized against certain effects of high temperatures.

It has been found that when maleic anhydride and acrylonitrile are present in the same polymeric environment, there is an apparent tendency for a reaction to occur that results in crosslinking and sometimes the evolution of carbon dioxide and/or water. This reaction occurs at elevated temperatures of the kind that can be reached during extrusion and molding operations. It would appear that the crosslinking occurs whether the acrylonitrile and maleic anhydride components are in the same or different polymer molecules.

The effect increases in significance with the amounts of the components and generally above about 15% of each component in a polymer composition is enough to generate the effect to a noticeable extent if the temperature is sufficiently elevated, that is above about 265° C.

While it is usually possible to extrude and mold at lower temperatures where no problem is encountered, it is desirable to provide accommodation for the wide variation of conditions that occur as a matter of course in a commercial operation. The present invention provides a means of reducing the significance of the crosslinking effect thus permitting the use of a wider range of molding and extrusion conditions with such polymers.

DISCUSSION OF THE PRIOR ART

The crosslinking effect referred to above has been identified, for example, in U.S. Pat. No. 4,223,096 which describes the preparation of rubber modified terpolymers of styrene, maleic anhydride and acrylonitrile. In that patent, the crosslinking tendency is controlled by the use of chain transfer agents such that up to about 20% acrylonitrile can be incorporated in a polymer containing from 15% to 30% of maleic anhydride before the crosslinking tendency renders the polymer non-thermoformable.

Other polymers in which such a tendency might be encountered in at least part of the ranges described include those described in U.S. Pat. No. 3,642,949; 4,141,934; 4,167,543; 4,197,263; 4,197,376 and 4,205,140.

The present invention provides a means of controlling this tendency and makes it possible either to extend the composition range so as to achieve even more advantageous properties, or to broaden the range of permissible processing conditions for the polymers.

DESCRIPTION OF THE INVENTION

The present invention provides a polymer composition with a reduced tendency to generate crosslinks comprising polymer units derived from an unsaturated nitrile and an unsaturated dicarboxylic acid anhydride, which composition comprises from 0.1 to 8% by weight based on the composition weight of a boron compound selected from the oxides and acids of boron and the esters of such acids.

The polymeric composition can be provided by a single polymer or it may be a blend of polymers. Thus, the polymeric composition can be, for example, a styrene/maleic anhydride/acrylonitrile terpolymer (or its rubber-modified equivalent) or a blend of a styrene/maleic anhydride copolymer (or its rubber-modified equivalent) with a styrene/acrylonitrile copolymer or an acrylonitrile/butadiene/styrene (ABS) copolymer or a nitrile rubber.

In general, the crosslinking effect begins even where the proportions of the nitrile and anhydride components are quite low but as might be expected, the significance of the effect increases proportionately with the amounts. Thus, the present invention has particular utility when the proportions of the nitrile and anhydride components are each above about 5% by weight of the composition weight. The process of the invention is particularly useful when the proportion of anhydride in the composition is between about 5 and 30% and the nitrile proportion is between about 5 and 20% of the total polymer composition.

The boron component is selected from the group consisting of boron oxide, boric acids (orthoboric, metaboric, boronic or borinic acids) and the esters of such acids including orthoborates, metaborates, boronates and borinates wherein the esterifying group(or groups) is(are) selected from alkyl, aralkyl, alkaryl or aryl groups, and any two such groups can together provide an alkylene group thus forming an cyclic group with the —O—B—O group to which it is attached. By careful selection of the groups $R_1$, $R_2$ or $R_3$, usually to provide at least one long chain alkyl group or an aryl group, it is possible to provide a plasticizing effect from the incorporation of a boron ester and this is often an advantageous feature.

The amount of the boron compound that is used is from 0.1 to 8% of the weight of the composition. It will be appreciated that with the higher molecular weight boron esters it may be desirable to use an amount at the upper end or even perhaps beyond the upper end of the specified range to achieve the level of boron in the composition that gives effective control over crosslinking. In general, the amount of the boron compound should be sufficient to provide the equivalent of from 0.1 to 2% by weight of boron oxide in the composition.

The boron compound can be added in any convenient manner but it is found that, when the anhydride-containing component and the nitrile containing component are in different polymers, there is advantage in blending a portion of the boron additive with each polymer component before they are blended together or alternatively with the anhydride containing component alone. The reason for this effect is not known for certain but it may simply be a reflection of the better dispersion of the additive thereby obtained.

DESCRIPTION OF THE PREFERRED EMBODIMENTS

To illustrate the invention further a number of boron compounds were blended with a polyblend comprising 36.5% by weight of a styrene/maleic anhydride/methyl methacrylate terpolymer comprising about 25.5% by weight of maleic anhydride and 62% of ABS (SAN-grafted polybutadiene particles dispersed in a matrix of an SAN copolymer) comprising about 13.7% by weight of acrylonitrile.

Except where otherwise indicated the terpolymer and ABS were blended together with a plasticizer (where one was used), and with the boron compound. This was then blended with a further ABS component. The blend was dried at 80° C. in a circulating air oven and extruded in a one inch Killion extruder using a two stage screw with vent or compounded in a Banbury mixer. Blending temperatures of about 200° C. were used.

Pellets of the blend were vacuum dried 16 hours at 80° C. and molded in a one ounce Arburg molding machine using 800 psi pressure. Izod bars (1.27 cm×1.27 cm×12.7 cm) were molded directly from the Arburg at a stock temperature of 282° C., and also after "Dwell times" (i.e. length of time in Arburg at stock temperature before being extruded), of 5, 10 and 15 minutes. At each time, three bars were molded and inspected closely to determine the extent of any blistering (indicating decomposition) that had occurred. The bars were then ground in a Thomas mill. The ground bars were vacuum dried 16 hours and used to measure apparent viscosity using an automated Melt Indexer. Four pressures and four flow times were used to measure apparent viscosities. The apparent viscosity was calculated from this data using the technique described in "Instron Capillary Rheometry," pages 24–25, published by Instron Corp., (Application Series SA-2). The apparent viscosity used in each case is the value at 100 sec$^{-1}$ and a rheometer set temperature of 246° C. The change in apparent viscosity gives an excellent indication of the changes that occur after exposure to the elevated temperature for prolonged periods. A higher viscosity indicates an increase in molecular weight due to crosslinking.

EXAMPLE 1

This Example is comparative in nature and illustrates what happens when the apparent viscosity of the above blend is measured, as described above, in the absence of any boron compound.

| Dwell Time (Min.) | Apparent Viscosity (kp) | Blistering |
| --- | --- | --- |
| 0 | 18.9 | None |
| 5 | 20.3 | Present |
| 10 | 26.6 | Excessive plus bar bulging |
| 15 | 32.4 | Excessive plus bar bulging |

As can be seen even after a dwell time of only five minutes under molding conditions the viscosity has started to climb and blistering has begun.

EXAMPLE 2

This Example uses the same formulation as Example 1 except that various amounts of 60 mesh boron oxide were blended into the formulation. The results are set forth in Table 1 below.

TABLE 1

| | Effect of Boron Oxide Addition | | |
| --- | --- | --- | --- |
| Amount of $B_2O_3$ | Dwell Time (Min.) | Apparent Viscosity (kp) | Blistering |
| 2% | 0 | 14.6 | None |
| | 5 | 15.2 | None |
| | 10 | 16.4 | Present but significantly less than in Ex. 1 after 10 min. |
| | 15 | 17.3 | Present but significantly less than in Ex. 1 after 15 min. |
| 1% | 0 | 15.3 | None |
| | 5 | 16.0 | None |
| | 10 | 17.3 | Present but significantly less than in Ex. 1 after 10 min. |
| | 15 | 19.1 | Present but significantly less than in Ex. 1 after 15 min. |
| 0.5% | 0 | 16.6 | None |
| | 5 | 17.5 | None |
| | 10 | 20.1 | Present but significantly less than in Ex. 1 after 10 min. |
| | 15 | 21.5 | Present but significantly less than in Ex. 1 after 15 min. |

As will be appreciated from the above the boron oxide significantly reduces the crosslinking and delays the onset of blistering for at least five minutes and also appears to moderate its severity. This effect is achieved even at 0.5% addition.

All samples retained excellent color characteristics.

EXAMPLE 3

This Example illustrates the use of orthoboric acid to achieve the stabilization of the polyblend used in Example 1. The results are set forth in Table 2 below.

TABLE 2

| | Effect of Orthoboric Acid Addition | | |
| --- | --- | --- | --- |
| Amount of $H_3BO_3$ | Dwell Time (Min.) | Apparent Viscosity (kp) | Blistering |
| % Acid (Control) | 0 | 18.0 | None |
| | 5 | 20.0 | Few Blisters |
| | 10 | 23.6 | Blisters and slight bulging |
| | 15 | 28.1 | Blisters and definite bulging |
| 0.44% (equiv. to .25 $B_2O_3$ | 0 | 17.2 | None |
| | 5 | 17.7 | None |
| | 10 | 19.5 | Present but significantly less than Ext. 1 at 10 min. |
| | 15 | 22.0 | Present but somewhat less than Ex. 1 at 15 min. |
| 0.89 (equiv. to 0.5% $B_2O_3$ | 0 | 15.2 | None |
| | 5 | 15.8 | None |
| | 10 | 17.4 | 2 blisters-no bulging |
| | 15 | 18.9 | Present but significantly less than Ext. 1 at 15 min. |
| 1.78% (equiv. to 1% $B_2O_3$ | 0 | 14.7 | Present |
| | 5 | 15.3 | Present |
| | 10 | 17.0 | Many - no bulging |
| | 15 | 18.3 | Many - no bulging |

All samples had excellent color. The blistering performance is much improved over the control Example (1) except at the 1.78% level. This is attributed to the evolution of water under molding conditions from the orthoboric acid. It should be noted, however, that the crosslinking tendency is in all cases significantly curbed.

EXAMPLE 4

The following Example describes the results obtained using, as the boron compound, 1% by weight of the borate ester tri-(2-methyl-2,4-pentane diol) biborate (sometimes called tri-hexylene glycol biborate), in the polyblend formulation described above except for the omission of the plasticizer additive. The "control" contained the plasticizer additive. The rheometer used was different from that used in Examples 1–3 and this was reflected in a slightly different internal temperature. In all other respects the technique used was the same.

TABLE 3

Boron Ester Results

| Dwell Time (Min.) | Apparent Viscosity (kp) | Blistering |
|---|---|---|
| Control | | |
| 0 | 14.3 | Few raised blisters |
| 5 | 15.4 | Blisters |
| 10 | 16.4 | Blisters plus swelling |
| 15 | 18.9 | Blisters plus swelling |
| Invention | | |
| 0 | 11.5 | Few blisters (not raised) more splay |
| 5 | 12.3 | Splay markings |
| 10 | 13.1 | Splay markings-few raised blisters |
| 15 | 15.6 | Splay, blisters, swelling |

The above amount of the ester corresponds to about 0.19% of boron oxide. Clearly, the crosslinking problem is significantly controlled but the control of blistering is not so well defined.

EXAMPLE 5

This Example is a repeat of Example 4 with the substitution of 2,6-di-tertbutylphenyl, diisopropyl borate as the ester. One percent of this compound is equivalent to 0.1% of boron oxide. The results are set forth in Table 4 below.

TABLE 4

Borate Ester Results

| | Dwell Time (Min.) | Apparent Viscosity (kp) | Blistering |
|---|---|---|---|
| Control (with Plasticizer) | 0 | 14.3 | Few raised blisters |
| | 5 | 15.4 | Blisters |
| | 10 | 16.4 | Blisters, plus swelling |
| | 15 | 18.9 | Blisters, plus swelling |
| Invention 1% borate ester (No plasticizer) | 0 | 12.3 | None |
| | 5 | 13.9 | Blisters |
| | 10 | 14.9 | Blisters |
| Invention 2% borate ester (No plasticizer) | 0 | 11.5 | None |
| | 5 | 12.4 | None |
| | 10 | 13.1 | Blisters |

The above results show that with the higher molecular weight borate esters, the amount to be added for effective control over crosslinking needs to be significantly higher than with the oxide or acid derivatives.

EXAMPLE 6

Evaluations similar to those described above showed that no significant improvement in the control of crosslinking was obtained using zinc borate or silicon boride as the boron compound.

EXAMPLE 7

This Example describes the use of a tributyl borate as the stabilizer additive in the formulation described above. The rheometer used was that used in Examples 1-3. The results are set out in Table 5 below.

TABLE 5

Results with Tributyl Borate

| | Dwell Time (Min.) | Apparent Viscosity (kp) | Blistering |
|---|---|---|---|
| Control | 0 | 16.3 | None |
| | 5 | 18.2 | Blisters |
| | 10 | 19.8 | Blisters-slight swelling |
| | 15 | 23.2 | Blisters-swelling |
| 0.5% ester | 0 | 14.9 | Few blisters |
| | 5 | 16.1 | Blisters |
| | 10 | 19.3 | Blisters |
| | 15 | 20.9 | Blisters |
| 1.0% ester | 0 | 16.5 | Couple of blisters |
| | 5 | 16.2 | Blisters |
| | 10 | 18.4 | Blisters |
| | 15 | 20.0 | Blisters |
| 1.5% | 0 | 15.4 | No blisters |
| | 5 | 15.8 | No blisters |
| | 10 | 18.1 | Blisters |
| | 15 | 18.8 | Blisters |
| 2.0% | 0 | 15.5 | No blisters |
| | 5 | 16.1 | No blisters |
| | 10 | 18.9 | Blisters |

The above data clearly show that an effective level of performance requires at least about 1.5% of the ester in the formulation.

EXAMPLE 8

This Example describes the use of phenyl boronic acid Ph—B—(OH)$_2$ as a stabilizer additive in the same formulation as was used above. The performance was evaluated in the manner described except that the rheometer used to determine the Apparent Viscosity was that used in Example 4. The results are set forth in Table 6.

TABLE 6

Results with Phenyl Boronic Acid

| | Dwell Time (Min.) | Apparent Viscosity (kp) | Blistering |
|---|---|---|---|
| Control 0% acid | 0 | 12.2 | None |
| | 5 | 14.0 | Blisters |
| | 10 | 15.5 | Blisters-slight swelling |
| 0.5% acid | 0 | 13.1 | Couple of blisters |
| | 5 | 13.0 | Blisters |
| | 10 | 15.1 | Blisters |
| 1.0% acid | 0 | 11.4 | Few blisters |
| | 5 | 12.2 | Few blisters |
| | 10 | 13.7 | Blisters |
| 2.0% acid | 0 | 10.7 | None |
| | 5 | 12.0 | Few blisters |
| | 10 | 11.4 | Blisters |

This Example shows clearly the greatly increased viscosity stability and a moderate delay in the onset of blistering, at least at the 1% additive level and higher.

EXAMPLE 9

This Example explores the effect of varying the point of addition of the boron compound (boron oxide).

An ABS component containing anti-oxidant and plasticizers (53%) was blended with 36.5% of the terpolymer described in Example 1, 10.5% of an SAN diluent and 0.3 parts (based on the blend weight) of an anti-oxidant.

In Run A—no boron compound was included.

In run B—the boron oxide (0.5%) was all in the ABS component.

In run C—the boron oxide (total 0.51%) was in the ABS and the SAN.

In run D—the boron oxide (total 0.54%) is extrusion blended with each separate polymer component (0.1% each in the terpolymer and the SAN) before these are blended together.

The weight of boron oxide is in each case based on the composition weight.

The performance of each product was evaluated in the manner described above and the results are set forth in Table 7.

TABLE 7

| | Addition of Boron Oxide - Mode Variation | | | | | | | |
|---|---|---|---|---|---|---|---|---|
| | Run A | | Run B | | Run C | | Run D | |
| Dwell Time | App. Visc. (kp) | Blistering | App. Visc. (kp) | Blistering | App. Visc. (kp) | Blistering | App. Visc. (kp) | Blistering |
| 0 | 16.2 | Yes | 15.0 | No | 13.8 | No | 12.1 | No |
| 5 | 17.3 | Yes | 16.3 | No | 15.1 | Two | 6.9 | No |
| 10 | 23.6 | Yes | 17.3 | No | 15.1 | Yes | 7.5 | No |

The above data show clearly that adding boron oxide such that at least part is incorporated in the anhydride-containing component significantly improves the efficiency of the additive in reducing blisters and preventing crosslinking.

From the above Examples it will be seen that a wide range of boron oxides, acids and borate esters are effective in controlling crosslinking and delaying the onset of blistering normally encountered in thermoforming a polyblend comprising units derived from an unsaturated anhydride monomer and an unsaturated nitrile monomer.

The preferred additives on account of their ready availability and low cost are boron oxide and orthoboric acid. However, the use of borate esters wherein at least one of the esterifying groups linked to the boron via an oxygen atom is sufficiently large can convey benefits by supplying the function of a plasticizer for the polymer. This is often a preferred feature of the invention. Satisfactory esterifying groups from this point of view are derived from alkaryl and $C_8$–$C_{20}$ alkyl or alkenyl radicals such as stearyl, palmityl, lauryl, capryl and oleyl radicals. Because such radicals are comparatively heavy it is often desirable to use mixed radicals to produce the ester to avoid the use of excessive amounts to supply the boron which is the active component in suppressing crosslinking. Thus, compound such as dimethyl, stearyl borate and esters such as

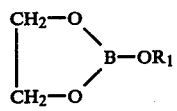

wherein $R_1$ is an alkyl group particularly a long chain alkyl group such as stearyl, are preferred borate esters.

The polymer composition whose processability is improved by the use of the boron compounds can be single polymers such as a terpolymer of styrene, maleic anhydride and acrylonitrile or a rubber-modified version of such a polymer as described, for example, in U.S. Pat. No. 4,262,096. Preferred terpolymers of this type comprise from 15 to 30% by weight of maleic anhydride and from 5 to 20% by weight of acrylonitrile. Particularly advantageous terpolymers of this type are rubber-modified terpolymers containing from 10 to 30% by weight of a rubber having a glass transition temperature below 0° C. and preferably below −30° C. Suitable rubbers include polybutadiene, a rubbery copolymer of styrene or acrylonitrile and butadiene, polyisoprene, polychloroprene, EPDM rubbers, ethylene/vinyl acetate rubbers, acrylate rubbers and polypentanamer.

Alternatively and often preferably some or all of the unsaturated nitrile can be provided by a different polymer from that providing the unsaturated dicarboxylic acid anhydride. Thus, the polymer composition can comprise an anhydride-containing polymer such as a styrene/maleic anhydride copolymer preferably one containing at least 10% by weight, and more preferably at least 20% by weight such as from 20 to 35% by weight of maleic anhydride, or a terpolymer with part of the styrene replaced by a non-nitrile copolymerizable monomer such as an acrylate or methacrylate ester so as to provide from 2 to 20% of the copolymer weight. The anhydride-containing polymer can, of course, be rubber-modified.

The nitrile-containing component of such a polymer composition can be provided by polymers such as styrene/acrylonitrile comprising from 20 to 70% by weight of acrylonitrile and acrylonitrile/butadiene/styrene (ABS) wherein the acrylonitrile content is preferably at least 8% and more preferably at least 15% of the ABS polymer weight.

The above exemplification is in terms of maleic anhydride and acrylonitrile but it is understood that some or all of these monomers can be replaced by their well known homologues such as (respectively) itaconic anhydride, aconitic anhydride and citraconic anhydride and methacrylonitrile.

In addition to the boron compound the polymer composition can contain other conventional additives such as antioxidants, plasticizers, chain-transfer agents, flame retardants, flow aids, pigments, antistatic additives, fibrous or particulate fillers and the like, to improve specific aspects of their physical or chemical properties. It is intended that all such and related modifications be considered within the purview of this invention.

What is claimed is:
1. A polymeric composition having a reduced tendency to crosslink during fabrication, which composition comprises polymer units derived from an unsaturated nitrile and from an unsaturated dicarboxylic acid anhydride and which also comprises from 0.1 to 8.0% by weight, based on the composition weights, of a boron compound selected from the group consisting of a boron oxide, boron acids and esters of boron acids wherein the esterifying groups are selected from alkyl, aralkyl, alkaryl, aryl or alkylene groups.

2. A polymeric composition according to claim 1 which comprises at least 5% by weight of polymer units derived from each of the anhydride and the nitrile.

3. A polymeric composition according to claim 1 in which the boron compound is boron oxide.

4. A polymeric composition according to claim 1 in which the boron compound is a ester of a boron acid and wherein at least one of the esterifying radicals is selected from the group consisting of $C_8$ to $C_{20}$ alkyl and alkylene radicals.

5. A polymeric composition according to claim 1 in which the amount of the boron compound is such as to provide the equivalent of 0.1 to 2% by weight of boron oxide to the composition.

6. A polymeric composition according to any one of claims 1 to 5 in which the polymer units derived from the unsaturated nitrile and the anhydride are present in the same polymer.

7. A polymeric composition according to any one of claims 1 to 5 in which the polymeric component comprises a terpolymer of styrene, acrylonitrile and maleic anhydride containing from 5 to 20% by weight of acrylonitrile and from 15 to 30% by weight of maleic anhydride.

8. A polymeric composition according to any one of claims 1 to 5 in which the polymeric component comprises a copolymer having from 50 to 83% by weight of styrene, from 10 to 35% by weight of maleic anhydride and from 2 to 20% by weight of methyl methacrylate and a copolymer of styrene and acrylonitrile containing from 20 to 70% of acrylonitrile, the relative proportions of the component polymers being selected to provide at least 5% based on the composition weight of each of the maleic anhydride and the acrylonitrile.

* * * * *